(12) United States Patent  (10) Patent No.: US 8,057,154 B2
Brommer et al.  (45) Date of Patent: Nov. 15, 2011

(54) DEVICE FOR MOVING A PRINTED PRODUCT

(75) Inventors: Carsten Brommer, Tecklenburg/Leeden (DE); Torsten Meineke, Bassum (DE)

(73) Assignee: Kolbus GmbH & Co. KG, Rahden (DE)

( * ) Notice: Subject to any disclaimer, the term of this patent is extended or adjusted under 35 U.S.C. 154(b) by 217 days.

(21) Appl. No.: 12/316,702

(22) Filed: Dec. 16, 2008

(65) Prior Publication Data

US 2009/0162178 A1 Jun. 25, 2009

(30) Foreign Application Priority Data

Dec. 22, 2007 (DE) .......................... 10 2007 062 607

(51) Int. Cl.
*B66C 1/42* (2006.01)
(52) U.S. Cl. ...... 414/741; 414/758; 414/680; 294/119.1
(58) Field of Classification Search .................. 414/680, 414/741, 758, 763, 783; 294/119.1, 103.1
See application file for complete search history.

(56) References Cited

U.S. PATENT DOCUMENTS 4,594,041 A * 6/1986 Hostetler .................... 414/24.5
2001/0028175 A1* 10/2001 Thompson et al. ........ 294/119.1

FOREIGN PATENT DOCUMENTS

| DE | 102 46 077 | 4/2004 |
| DE | 10 2004 006 128 | 2/2005 |
| EP | 0 790 139 | 8/1997 |

* cited by examiner

*Primary Examiner* — Donald Underwood
(74) *Attorney, Agent, or Firm* — Alix, Yale & Ristas, LLP

(57) ABSTRACT

A device (1) for moving a book (2) with a clamping device (3) moved by a first drive (22, 23) and having two clamping jaws (3*a, b*) that can be displaced in a parallel to open and close the clamping device, with a gear mechanism (8) on the moving clamping device (3) that converts a rotative movement into a linear adjusting movement for the clamping jaw (3*a, b*) which can be displaced in parallel, with a controllable second drive (21) that is arranged stationarily, and with a permanent driving connection (13, 14, 15) between the second drive (21) and the gear mechanism (8). The second drive (21) is not arranged on the moving system, such that the clamping device (3) can be realized in a lightweight construction. Pneumatic and electric connecting lines and signalling lines (35*a, b*) for the second drive (21) can be permanently installed.

21 Claims, 1 Drawing Sheet

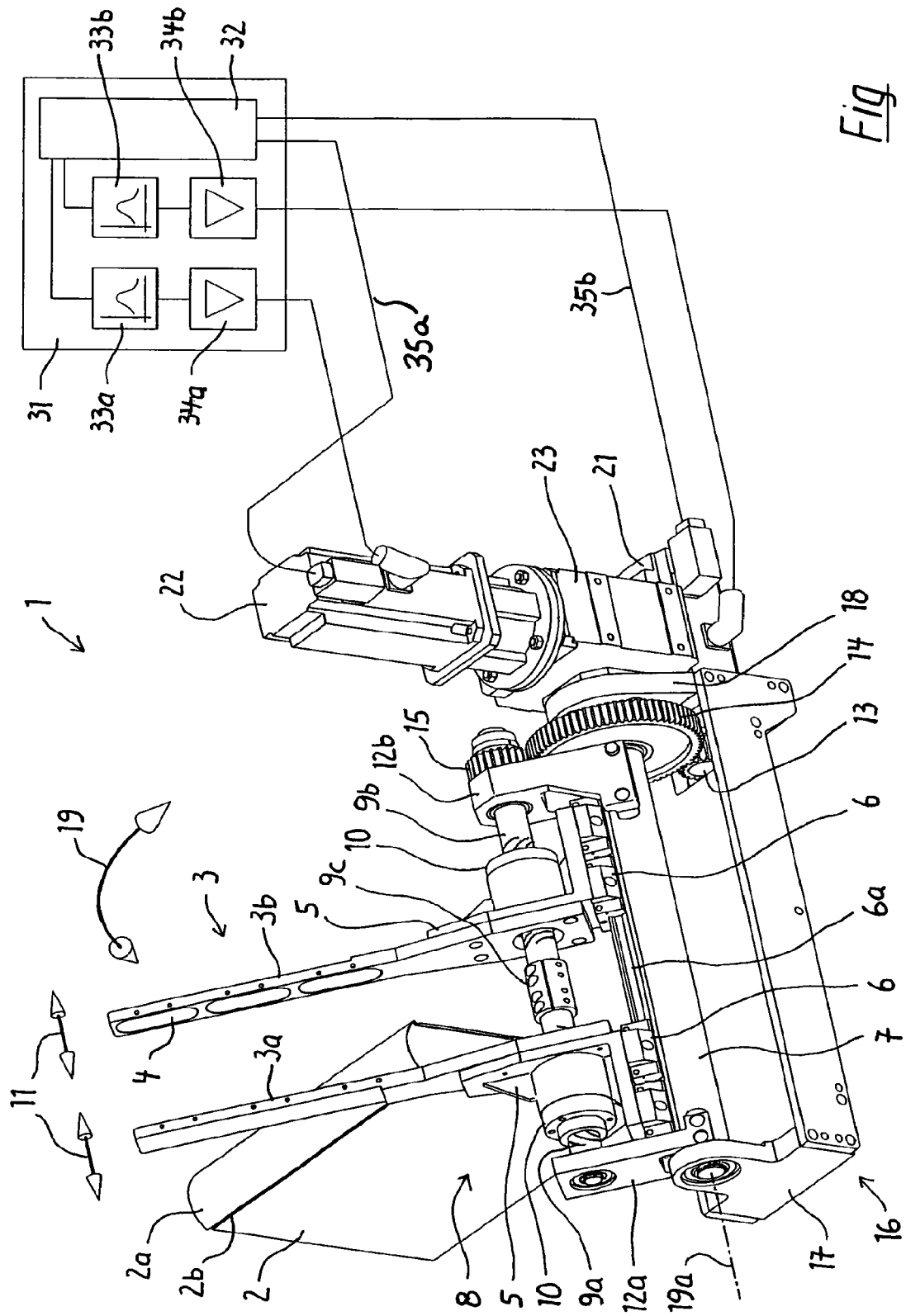

DEVICE FOR MOVING A PRINTED PRODUCT

BACKGROUND

The present invention pertains to a device for moving a book, a bound book block or a book block that is loosely gathered of sheets and/or folded sections or similar printed book products.

Devices of the aforementioned type, in which the printed book product is fixed between clamping jaws, are used for feeding the printed product to a processing station or for transferring the printed product from this processing station to the next processing station or for delivering the printed product from the processing station, without the individual components of the printed product such as, e.g., the sheets and/or folded sections of an unbound book block shifting relative to one another such that they are no longer mutually aligned. A gripped delivery is also beneficial with respect to the quality of a freshly bound printed product such as, e.g., a freshly cased-in and/or joint-formed book.

EP 790 139 B1 describes a feeding device for a perfect-binding machine with a gripper that can be pivoted back and forward about a pivoting axis in order to transfer an unbound book block from a horizontal transfer position into an upright position above a block clamp of the perfect-binding machine that subsequently receives the book block. The gripper is opened and closed by means of a cogwheel mechanism that is driven in a rotative fashion by a drive that is arranged on the gripper and makes it possible to displace the assigned clamping jaw parallel to the other stationary clamping jaw.

DE 10 2004 006 128 A1 shows and describes a turning device, by means of which books received in an upright position are taken hold of, pivoted outward transverse to the feed transport direction and transferred into a defined horizontal delivery position that is spaced apart from the feed transport path in a synchronized fashion. The turning device comprises four grippers that jointly revolve in an intermittent fashion, wherein the grippers successively receive the books and respectively deliver the books after three 90° turning steps in order to return into the receiving position with the fourth turning step. The grippers are designed in such a way that an inner clamping plate can be adjusted to the format thickness and an outer clamping plate can be actuated by a pneumatic cylinder in order to clamp the books.

The disadvantage of these known devices can be seen in that the driving means for realizing the opening and closing movements are also moved. This increases the weight to be moved and the connecting lines are continuously subjected to mechanical stress. In revolving devices as it is the case with DE 10 2004 006 128 A1, a complicated rotary leadthrough for the connecting lines is also required.

DE 102 46 077 A1 discloses a clamping device that can be turned by plus 90° or minus 90° about the center line of a sheet stack accommodated therein. The clamping jaws are opened and closed symmetrically referred to a central plane, wherein the clamping jaws are spring-mounted on pressure pads that can be adjusted into a closed position and an open position. For this purpose, coupling rods are used in order to eccentrically connect the pressure pads to worm gears that are connected to and driven by endless screws such that they can be turned back and forth by 180° between a coinciding state that is assigned to the closed position and an extended state of the coupling rod and the worm gear that is assigned to the open position. The endless screws can be actuated manually or in a motor-driven fashion, wherein the motor drive does not participate in the rotation of the clamping device. The closed position and the open position are also secured when the endless screws are not driven due to the self-locking worm gear pair and the aforementioned dead-center positions of the coupling rod and the worm gear.

The disadvantage of the clamping device known from DE 102 46 077 A1 can be seen in that the clamping force exerted upon the printed product by the clamping jaws cannot be variably adjusted. The clamping force specifically results from the deflection of the clamping jaw resting against the printed product relative to the pressure pad that is adjusted inward into a fixed position, wherein the clamping force increases proportionally with the product thickness. The opening and closing of the clamping device only takes place in its rotative end positions, in which the endless screws are connected to and driven by the motor drive, such that the width of the opening between the clamping jaws cannot be adjusted during the rotation of the clamping device.

SUMMARY

The object of the present invention is to provide a device for moving a book, a bound book block or a book block that is loosely gathered of sheets and/or folded sections or similar printed book products, by which it is possible to transport the printed product quickly and flawlessly and the spacing between the clamping jaws can be varied in a defined fashion during the return movement.

According to the present disclosure, this object is attained with a gear mechanism that is arranged on the moved clamping device and converts a rotative movement into a linear adjusting movement for the at least one clamping jaw that can be displaced in a parallel fashion, with a controllable second, stationary drive that is arranged with a permanent driving connection between the second drive and the conversion gear mechanism. The driving means for opening and closing the clamping jaws are not arranged on the moving system such that a particularly lightweight construction of the clamping device can be realized and the clamping device can be moved in a highly dynamic fashion. Pneumatic and electric connecting lines and signalling lines for the second drive can be permanently installed. The controllable second drive that is permanently connected to the clamping device makes it possible to adjust the at least one clamping jaw into defined open and closed positions, also during the movement of the clamping device. A holding force that is adapted to the respective printed product and ensures a particularly careful treatment thereof can be generated in order to flawlessly transport the printed products.

BRIEF DESCRIPTION OF THE DRAWING

The salient characteristics of the present invention are elucidated in the following description of one preferred embodiment, with reference to the accompanying drawing in which a single FIGURE shows a perspective representation of a pivoted gripper for the gripped transfer of a book.

DETAILED DESCRIPTION

With reference to the FIGURE, the pivoted gripper 1 comprise a clamping device in the form of a clamping gripper 3 that can be pivoted back and forth about a horizontal axis of rotation 19*a* and features a left and a right clamping jaw 3*a* and 3*b* that can be displaced parallel to one another in opposite directions and centrally opened and closed in this fashion.

In this instance, the opening and closing movement 11 of the clamping jaws 3a,b extends parallel to the axis of rotation 19a.

The pivoted gripper 1 is able to laterally take hold of a book 2 that is supplied in a first position, in which it stands, for example, on its front edge (opposite the spine), as well as to turn and transfer that book into a second position that is offset relative to the first position in the form of a pivoting movement 19 by 180°, wherein the second position may be a working position of a not-shown processing device, into which the book 2 is transferred with the spine 2a pointing downward.

On their inner side, the clamping jaws 3a,b feature cushions 4 that are acted upon by pressure springs that are deflected as the clamping jaws 3a,b approach the book 2 and generate a clamping force that is defined in accordance with the deflection.

The clamping jaws 3a,b are accommodated on holders 5 that can be displaced along a guide rail 6a mounted on a pivoted console 7 by means of linear guides 6. The pivoted console 7 is rotatively supported in bearings 17, 18 of a rack 16 and connected via a gear 23 to a first drive of the pivoted gripper 1 that is realize in the form of a servomotor 22 and serves for rotatively pivoting the clamping gripper 3.

The adjusting movement for opening and closing the clamping gripper 3 is realized with a spindle gear mechanism 8 that consists of a left and a right threaded spindle 9a and 9b that respectively feature a left-handed and a right-handed thread and are connected to one another in a driving fashion by means of a coupling sleeve 9c, as well as assigned spindle nuts 10 that are accommodated in the holders 5 of the clamping jaws 3a,b.

The interconnected threaded spindles 9a,b are rotatively supported in bearings 12a,b arranged on the pivoted console 7, wherein the right threaded spindle 9b features a gear wheel 15 that meshes with a freely rotatable gear wheel 14 supported on the pivoted console 7 in the pivoting axis 19a, and wherein the latter gear wheel meshes with a pinion gear 13 seated on the output shaft of a second drive of the pivoted gripper 1 that is realized in the form of a servomotor 21 and, according to the invention, stationarily arranged on the rack. The respective pivoting movements of this second drive consequently displace the clamping jaws 3a,b relative to one another such that the clamping gripper 3 is opened and closed.

Since a relative movement between the threaded spindles 9a,b and the output of the servomotor 21 occurs during the pivoting movement 19 of the clamping gripper 3, the permanent driving connection induces a rotative movement in the threaded spindles 9a,b via the gear wheels 13, 14, 15, wherein this rotative movement causes the clamping gripper 3 to open or close, without any rotation of the actual drive 21. This displacement can be compensated by actuating the servomotor 21 accordingly.

For this purpose, the servomotor 21 is connected in a controllable fashion to the servomotor 22 by means of a controller 31. A central control unit 32 processes the respective absolute rotational positions of both servomotors 21, 22 that are received via resolver feedbacks 35a,b in order to act upon the respective motor control 34a or 34b in connection with the specified movements stored in so-called electronic plate cams such that the specified pivoting movement 19 of the pivoted gripper 1 and the mutual spacing between the clamping jaws 3a,b are exactly observed in accordance with specifications.

In this case, the specification for the mutual spacing between the clamping jaws 3a,b may not merely consist of the spacing remaining constant during the pivoting movement of the clamping gripper 3 as it is required for generating a constant clamping force during a gripped transport, but also of additionally opening or closing the clamping jaws 3a,b during the return movement, for example, in order to move past the wider book spine, to avoid other feeding or delivering transport means or to provide a lateral guide for the transferred book 2 and the book to be transferred next, respectively. Naturally, the specification also includes standstill positions of the clamping gripper 3, in which the clamping jaws 3a,b are opened or closed in order to receive or release a book 2.

The specification is defined in a parameterized motion curve that decisively depends on the thickness of the book and was transferred into a corresponding electronic plate cam 34b with consideration of the relative movement to be compensated during the pivoting movement 19. During the gripped pivoting movement 19, the servodrive 21 may also be readjusted in accordance with a certain driving torque such that a predetermined clamping force that needs to be maintained constant can be generated between the clamping jaws 3a,b or its cushions 4, respectively.

The invention is not limited to the described embodiment. The clamping device may also carry out a linear movement, in which case the driving connection is realized in the form of a toothed rack, or the clamping device may rotate in a revolving fashion. The clamping jaws may also be realized in the form of joint rails for taking hold of the formed joints 2b of a book 2 that are recessed relative to the outer sides of the book.

The invention claimed is:

1. A device (1) for moving a printed book product (2), comprising:
   a clamping device (3) including two clamping jaws (3a, b) that are arranged parallel to one another and thereby define a variable space within which to clamp the printed product (2) with a preestablished clamping force, wherein the space between the clamping jaws (3a, b) can be varied by a parallel linear displacement movement of at least one clamping jaw (3a, b) relative to the other in order to open and close the clamping device (3);
   a first drive (22, 23) operatively associated with the clamping device, for moving the clamping device such that a clamped book product is movable between initial and final positions;
   a rotative gear mechanism (8) arranged on the movable clamping device (3) and responsive to the first drive for converting rotative gear movement into said linear movement of the at least one clamping jaw (3a, b) to achieve said parallel displacement;
   a controllable second, stationary drive (21), and
   a permanent driving connection (13, 14, 15) between the second drive (21) and said rotative gear mechanism (8) whereby said second drive selectively also converts rotative gear movement into said linear movement.

2. The device according to claim 1, wherein the clamping device (3) as driven by the first drive, carries out a pivoting movement (19) about an axis of rotation (19a) between the initial and final positions.

3. The device according to claim 2, wherein the pivoting movement (19) of the clamping device (3) is realized in the form of a back and forth pivoting movement by a defined angle.

4. The device according to claim 2 wherein the driving connection (13, 14, 15) includes a gear having a rotation axis that is coaxial with the axis of rotation (19a) of the clamping device.

5. The device according to claim 2, wherein the linear movement for opening and closing (11) of the at least one clamping jaw (3a, 3b) takes place parallel to the axis of rotation (19a) of the clamping device (3).

6. The device according to claim 2, wherein means are provided for generating a signal commensurate with an angle at which the clamping device has pivoted and the second drive (21) is an electric motor (21) that is controlled in dependence on the signal that is commensurate with the pivot angle.

7. The device according to claim 1, wherein the second drive is a servomotor (21); means (35a, 35b) are provided for generating respective first and second signals commensurate with (first) the angle at which the clamping device has pivoted and (second) the absolute rotational position of the servomotor; and a controller controls the second drive (21) in dependence on the first signal.

8. The device according to claim 7, wherein the displacement of the at least one clamping jaw (3a, b) caused by the movement of the clamping device (3) is supplemented by the second drive (21).

9. The device according to claim 7, wherein the second (21) drive variably controls the space between the clamping jaws (3a, b) in dependence on the position of the clamping device during the movement of the clamping device (3).

10. The device according to claim 7, wherein the second drive (21) variably controls the space between the clamping jaws (3a, b) in accordance with a motion curve that is defined by at least one stored parameter.

11. The device according to claim 10, wherein the motion curve is defined by the thickness of the printed product (2).

12. The device according to claim 7, wherein a defined clamping force can be generated between the clamping jaws (3a, b) by the second drive (21).

13. The device according to claim 7, wherein the second drive (21) variably controls the space between the clamping jaws (3a, b) to match a predetermined clamping force.

14. The device according to claim 1, wherein said rotative gear mechanism (8) is realized in the form of a spindle gear mechanism (8) with at least one threaded spindle (9a, b) and an assigned spindle nut (10).

15. The device according to claim 1, wherein both jaws of the clamping device (3) are moveable toward and away from each other such that the clamping device can be opened and closed centrally referred to the product.

16. The device according to claim 4, wherein the pivoting movement (19) of the clamping device (3) is realized in the form of a back and forth pivoting movement by a defined angle.

17. The device according to claim 5, wherein the pivoting movement (19) of the clamping device (3) is realized in the form of a back and forth pivoting movement by a defined angle and the driving connection (13, 14, 15) includes a gear having a rotation axis that is coaxial with the axis of rotation (19a) of the clamping device.

18. The device of claim 8, wherein the clamping device (3) as driven by the first drive, carries out a pivoting movement (19) about an axis of rotation (19a).

19. The device of claim 6, wherein the pivoting movement (19) of the clamping device (3) is realized in the form of a back and forth pivoting movement by a defined angle; the driving connection (13, 14, 15) includes a gear having a rotation axis that is coaxial with the axis of rotation (19a) of the clamping device; and the linear movement for opening and closing of the at least one clamping jaw (3a, 3b) takes place parallel to the axis of rotation (19a) of the clamping device (3).

20. The device of claim 7, wherein the clamping device (3) as driven by the first drive, carries out a pivoting movement (19) about an axis of rotation (19a); the pivoting movement (19) of the clamping device (3) is realized in the form of a back and forth pivoting movement by a defined angle; the driving connection (13, 14, 15) includes a gear having a rotation axis that is coaxial with the axis of rotation (19a) of the clamping device; and the linear movement for opening and closing of the at least one clamping jaw (3a, 3b) takes place parallel to the axis of rotation (19a) of the clamping device (3).

21. A device (1) for moving a printed book product (2), comprising:
  two clamping jaws (3a,b) arranged parallel to one another and thereby defining a variable space within which to clamp the printed product (2) with a preestablished clamping force, wherein the space between the clamping jaws (3a,b) can be varied by a parallel displacement of at least one clamping jaw (3a,b) relative to the other;
  a console (7) on which the clamping jaws are guided (6) for said parallel displacement, said console being rigidly supported on a main shaft extending between spaced apart bearings (17, 18) along a main pivot axis (19a);
  a first drive (22, 23) for rotating said main shaft and thereby pivoting the console (7) with jaws about the main pivot axis whereby a book product clamped in the jaws is movable between initial and final pivot angle positions;
  a rotative gear mechanism (8) including a spindle (9) and at least one spindle nut (10) supported by the console and movable around the main pivot axis (19a) with the console, wherein said at least one spindle nut (10) is connected to a respective at least one clamping jaw (3a,b);
  a passive gear configuration (14, 15) including a gear (14) that is centered on and freely rotatable relative to said main shaft, coupled to the spindle (9) of the rotative gear mechanism (8) by which the movement of the rotative gear mechanism with the console about the main pivot axis (19a) rotates the spindle (9) and displaces the at least one spindle nut (10) parallel to the main pivot axis to produce a linear adjusting movement of the at least one clamping jaw (3a, b) to achieve said parallel displacement;
  a second, stationary drive (21); and
  a stationary active gear (13) driven by the second drive (21) and coupled to the passive gear configuration (14, 15) by which the second drive provides a controllable supplemental rotation of the spindle (9) and displacement of the at least one spindle nut (1, 10) parallel to the main pivot axis, independent of the first drive.

* * * * *